United States Patent [19]

Reminger

[11] 4,305,532
[45] Dec. 15, 1981

[54] UNIVERSAL BICYCLE CARRIER
[76] Inventor: John F. Reminger, 6508 Amigo, Reseda, Calif. 91335
[21] Appl. No.: 59,484
[22] Filed: Jul. 20, 1979
[51] Int. Cl.³ .............................. B62J 1/16; B62J 7/02
[52] U.S. Cl. ................... 224/31; 224/32 R; 280/202; 297/243; 297/429
[58] Field of Search ............... 224/30 R, 31, 32 R, 224/34, 35, 39; 297/243, 423, 429, 431, DIG. 9; 280/202, 289 A, 291

[56] References Cited

U.S. PATENT DOCUMENTS

| | | | |
|---|---|---|---|
| 453,212 | 6/1891 | Sager | 297/243 X |
| 3,542,419 | 11/1970 | Spinola | 297/429 X |
| 3,738,704 | 6/1973 | Smith et al. | 297/243 X |

FOREIGN PATENT DOCUMENTS

| | | | |
|---|---|---|---|
| 12131 | 5/1909 | Denmark | 280/202 |
| 564848 | 11/1932 | Fed. Rep. of Germany | 280/202 |
| 910389 | 11/1956 | Fed. Rep. of Germany | 280/202 |
| 13982 | of 1892 | United Kingdom | 280/202 |
| 158449 | 2/1921 | United Kingdom | 224/35 |
| 501461 | 2/1939 | United Kingdom | 280/202 |
| 594731 | 11/1947 | United Kingdom | 297/243 |
| 622890 | 5/1949 | United Kingdom | 280/202 |

*Primary Examiner*—Stephen Marcus
*Attorney, Agent, or Firm*—Poms, Smith, Lande & Rose

[57] ABSTRACT

The present universal bicycle load carrier has a generally rectangular horizontal load carrying surface about four or five inches wide which extends from the upper front portion of a bicycle frame toward the frame below the seat. It includes a notch which precisely fits the thicker front portion of virtually any bike, and the carrier is held in place below of the large "crown" nut located at the upper front portion of the frame, with the top of the carrier near the notch engaging the rearwardly angled heavy upper front portion of the frame. Other features include arrangements for (1) securing the carrier to the bar of a man's bike; (2) securing the carrier to the rear frame member of a woman's bike; (3) holding a foot rest; (4) carrying books etc.; and (5) carrying a baby seat. The carrier may be quickly installed and removed without tools.

15 Claims, 11 Drawing Figures

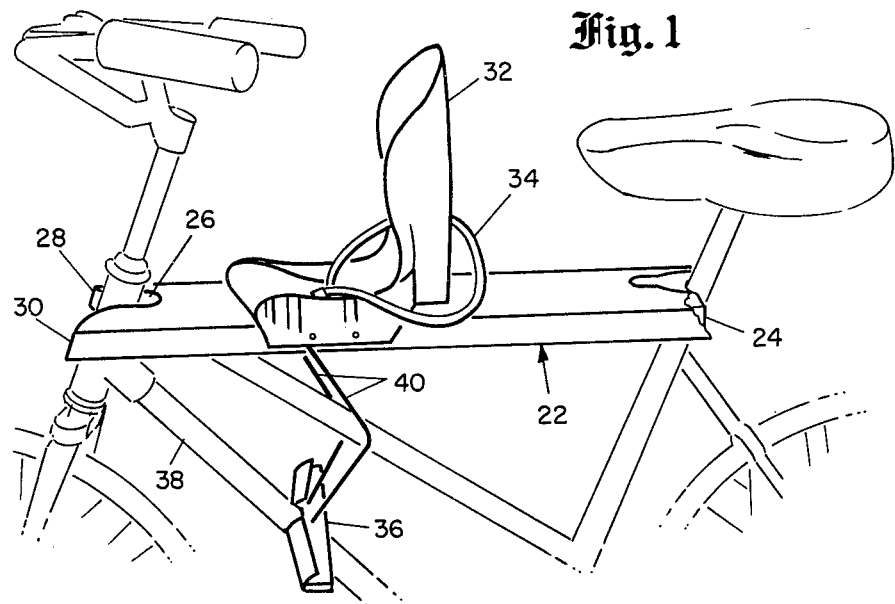
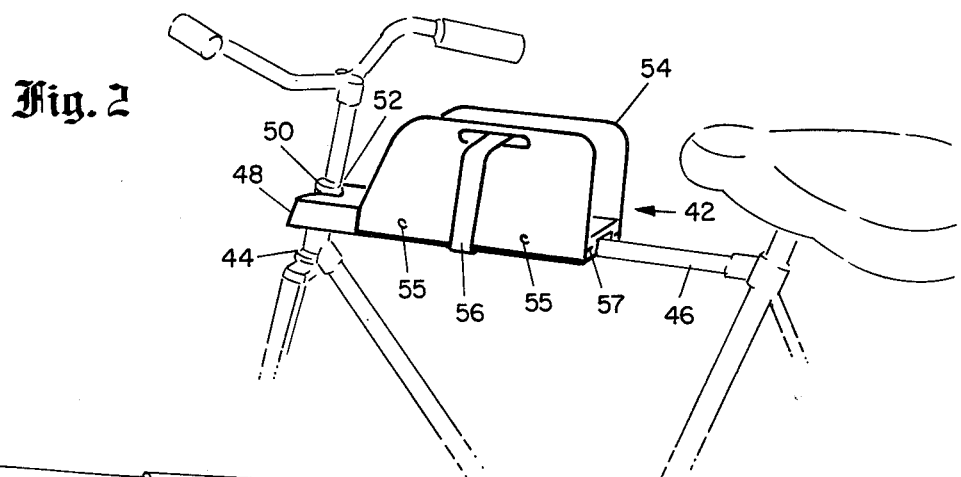
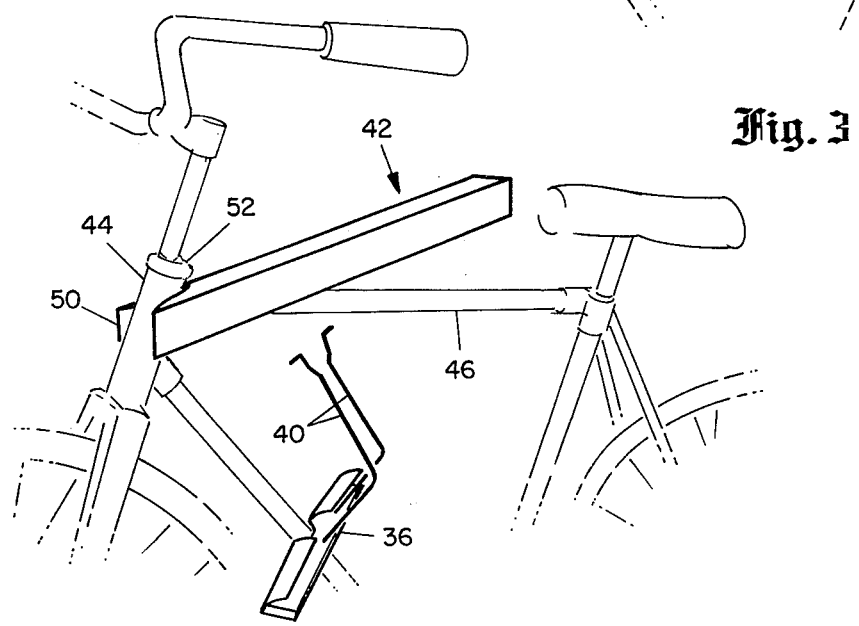

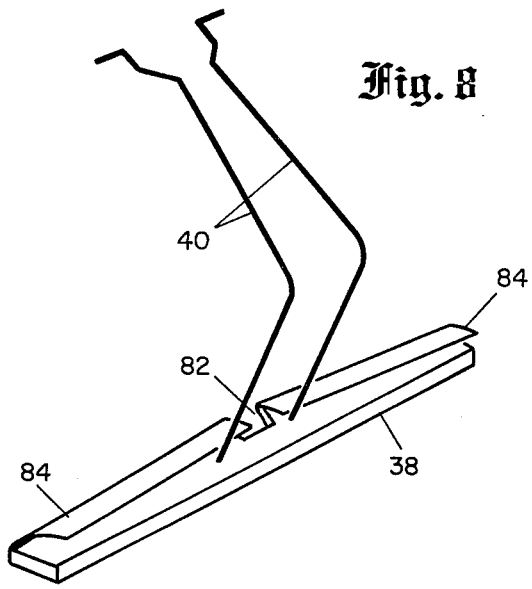
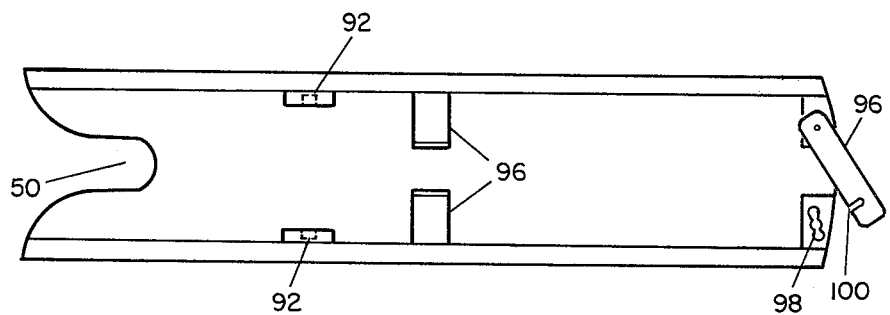
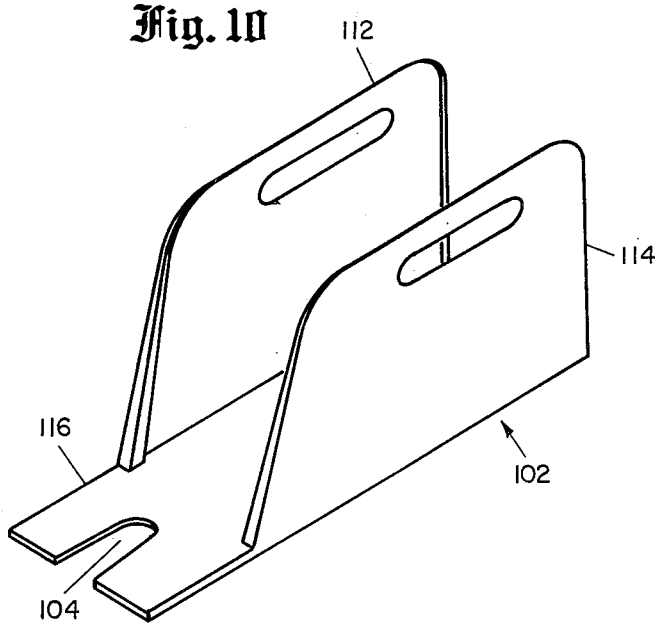
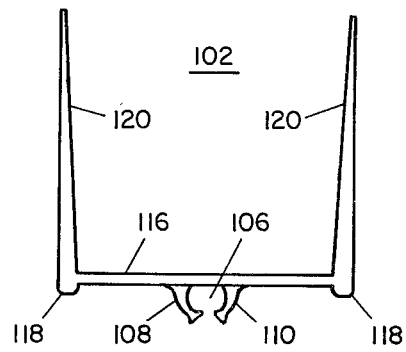

4,305,532

UNIVERSAL BICYCLE CARRIER

FIELD OF THE INVENTION

This invention relates to arrangements for carrying books, parcels, or young children on a bicycle.

BACKGROUND OF THE INVENTION

It has previously been proposed to carry young children on the back of a bicycle behind the seat. Also, baskets or other arrangements for carrying parcels have been proposed for mounting in front of the handlebars of a bicycle. However, when the load over either of the front or rear wheels comes relatively heavy, the bicycle becomes unstable and difficult to use in a controlled and safe manner. Further, the carriers which have been proposed for bicycles up to the present time have generally been relatively complex and difficult to secure to the bike, requiring removal of the wheel nuts, and the attaching of a number of bracing members to the handlebars or to the frame by nuts, bolts, or screws, through the use of hand tools. In addition, most of the carriers which have previously been proposed are specially made for particular brands of bikes and are not applicable to all different makes and styles.

Accordingly, a principal object of the present invention is to provide a universal bike carrier, which is easily installed without tools, and which does not interfere with the stability and control of the bike.

SUMMARY OF THE INVENTION

In accordance with the present invention a special carrier is provided for mounting on the upper front portion of the main frame of a bicycle and extending toward the seat of the bicycle. The mounting arrangements for the carrier are based on the discovery that virtually every bike has a heavy front frame member which is inclined to the rear at an angle of 15 degrees, and has a diameter equal to approximately $1\frac{1}{8}$ inches. In addition, the horizontally extending bar on a man's bike has a diameter of approximately $\frac{3}{4}$ inch or $\frac{7}{8}$ inch. Further, the crown nut at the upper front portion of the frame, is of considerably increased diameter as compared with the diameter of the main front member of the frame and is nearly always located $\frac{1}{4}$ inch or more above the top surface of the intersecting frame member extending from the rear in either a man's bike or a woman's bike. By providing a deep notch in the upper front surface of the carrier having a width of approximately $1\frac{1}{8}''$ toward the rear of the notch, the carrier member may be merely inserted at an angle at the junction of the forwardly extending frame member and the thicker front portion of the frame, and then tilted back into a substantially horizontal position. This very simple installation procedure precludes the need for any wrenches, screwdrivers, pliers, or the like in the quick installation and removal of the carrier, in accordance with the present invention.

In accordance with other features of the invention, (1) the carrier may be provided with a front surface which is angled at the same 15 degrees relative to the vertical of the front portion of the frame; (2) the carrier may be provided with a lower notch which engages the thick front member of the frame at a point spaced down an inch or two to give additional stability against tipping of the carrier; (3) a longitudinally movable member may be provided at the rear of the carrier for engaging the frame or the seat support of a lady's bike just below the seat; (4) a baby seat and strap may be provided for mounting on the carrier; (5) a footrest for a small child may be mounted on wires for installation into the carrier and for resting on one of the frame members of the bike; (6) additional orientation elements may be provided in the carrier for alignment with the rearwardly extending bar of a man's bicycle; (7) a preformed carrier structure having sides to retain books or other parcels may be formed of plastic or other moldable material; and (8) the elongated carriers are in the order of three to five inches in width and from $\frac{3}{8}$ inch to two inches in thickness, with a width of about four and one-quarter and a thickness of about one and one-half inches being employed in the presently preferred embodiment.

Advantages of the carrier of the present invention include the ease of installation (without tools), the location of the additional weight between the front and rear wheels rather than over them to minimize adverse effects on steering and control of the bike, the stability of the unit, the low wind resistance, and the universal applicability of the carrier in that it fits all bicycles, man's and lady's bikes, single speed, three speed and ten speed bikes.

Other objects, features and advantages of the invention will become readily apparent from a consideration of the following detailed description and from the accompanying drawings.

BRIEF DESCRIPTION OF THE DRAWINGS

FIG. 1 shows a universal carrier illustrating the principles of the present invention mounted on a lady's bike with a child's seat attached to it;

FIG. 2 shows an alternative short form carrier secured to a man's bike, and with a parcel holding frame secured to it;

FIG. 3 shows the mode of installation of the universal carriers of the present invention without the need for any tools;

FIG. 8 is a showing of the footrest included in FIG. 1;

FIG. 9 is a bottom view of the style carrier shown in FIGS. 2 and 3; and

FIGS. 10 and 11 are an isometric view and and end view, respectively, of a special short form molded carrier for accommodating books, packages or the like.

DETAILED DESCRIPTION

Figure 4:
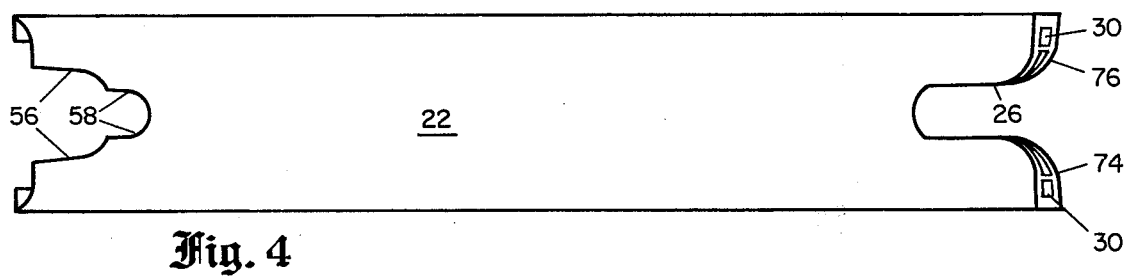
FIGS. 4, 5 and 6 are top, side, and bottom views, respectively, of the universal carrier which is applicable to both a man's and a lady's bike.
Figure 5:
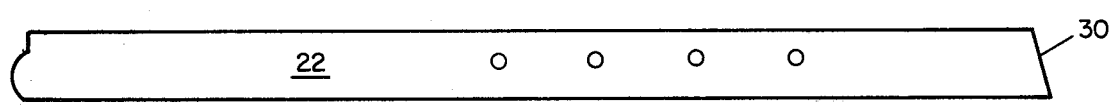

Referring more particularly to the drawings, FIG. 1 shows a universal carrier 22 mounted on a woman's bike. As part of the assembly, the slidable rear member 24 engages the seat support. The rear end of the carrier 22 is shown cut away in FIG. 1 to show the members 24 more clearly, to supplement the showings of FIGS. 6 and 7. In addition, the front end of the carrier 22 is notched at 26 to enclose the thicker front member 28 of the bicycle frame. The notch 26 is tapered to firmly engage the two sides of this member 28. The member 28 makes an angle of approximately 15 degrees with the vertical, and the front surface 30 of the carrier is preferably angled correspondingly. In addition to engaging the frame member 28 at the upper surface of the notch 26 in carrier 22, the notch may include side surfaces which also engage the frame member 28 at the lower edge of the carrier, or throughout the depth of the carrier.

A baby seat 32 complete with strap 34 is secured to the carrier 22. In addition, a footrest 36 is provided for the convenience of the small passenger who will be riding in seat 32. The footrest 36 engages the frame member 38, and the heavy resilient supporting wires 40 engage openings in the inner construction of the carrier 24 to hold it in place.

FIG. 2 shows an alternative shorter version of a carrier 42 mounted to engage the front portion 44 of the frame of the bike and resting on the horizontally extending frame member 46 of the man's bicycle. As in the case of the carrier 22 shown in FIG. 1, the front portion 48 of the carrier 42 is angled at 15 degrees to match the angle of orientation of the front frame member 44, and the carrier 42 has a central recess 50 which engages the front frame member 44, and directly underlies the crown nut 52 which is secured to the upper end of the frame member 44 about ¼ or ½ inch above the front end of the bar 46. The crown nut 52 overlies the upper surface of the carrier 42 on either side of the notch or recess 50. Shown mounted on the upper surface of the carrier 42 is a retaining structure 54 to hold books or other articles, and a resilient strap 56, which may have a buckle, or hooks at both ends, is provided for holding the articles in place. The retaining structure 54 may be secured to carrier 42 by screws 55, or by slidably interfitting recesses 57.

FIG. 3 shows the very simple mode of installation or removal of the carrier 42 from the bike. More specifically, note that, to install the carrier 42 all one has to do is to slide the notched end forward along the horizontal frame member 46 until the front notch engages the front portion 44 of the frame, and then depress the rear end of the carrier 42 so that it is held firmly in place by the recesses which fit over the bar 46, and by the lower edges of the recess 50.

It may be noted again that no tools are required for putting the carrier on or taking it off of a bike, and further that, when wood or other suitable structural materials, such as fiberglass reinforced plastic, are employed in the construction of the carrier, there is no scraping or marring of the painted surface of the bicycle as the carrier is installed and removed.

FIG. 4 is a top view of the carrier 22 shown in FIG. 1, and which as mentioned above is suitable for both a lady's and a man's bicycle. Shown at one end in FIG. 4 are the end surfaces 30 of the carrier, and the notch 26. The configuration of the notch 26 is particularly important, and its dimensions are set forth in the following Table I. In connection with the following Table I, the dimensions 2 thru 7 as listed therein are the widths of the recess at various distances from the upper front surface of the carrier.

TABLE I

| | | |
|---|---|---|
| 1. | Width of Carrier | 4¼" |
| 2. | Depth of Front Notch or Recess | 2⅜" |
| 3. | Width @ 2-7/16 from Upper Front Edge | 1⅛" |
| 4. | Width @ 2" from Upper Front Edge | 1-3/16" |
| 5. | Width @ 1½" from Upper Front Edge | 1¼" |
| 6. | Width @ 1⅜" from Upper Front Edge | 1⅜" |
| 7. | Width @ ¾" from Upper Front Edge | 1½" |

From an overall standpoint, the gradual nature of the notch or recess 26 permits easy assembly of the carrier to the front portion of the frame member of the bike, which is normally 1⅛ inches in diameter. As can be observed from the table noted above, this is the final width of the recess or notch 26.

At the other end of the carrier 22 is another recess or opening 56 having a region of moderately shallow curvature toward the end of the carrier 22 and a small additional recess 58 along the center line of the carrier 22. The larger recess or opening 56 is to provide clearance around the adjusting screws and the like often found below the seat on a lady's bicycle.

Figure 6:
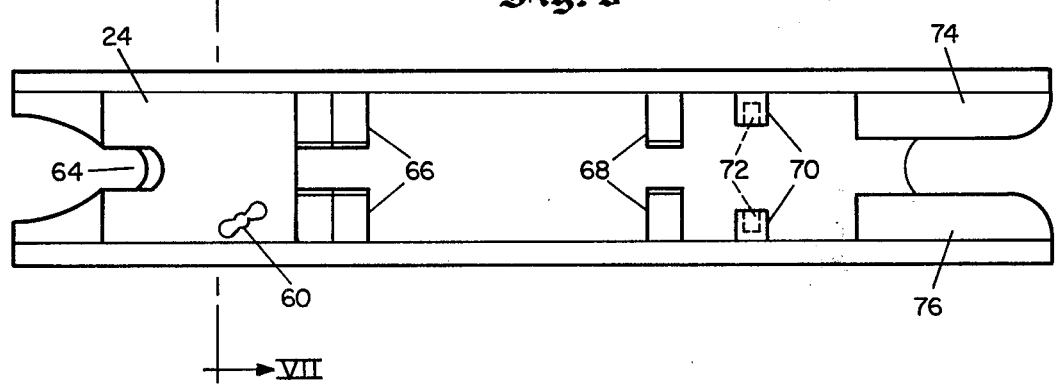
Figure 7:
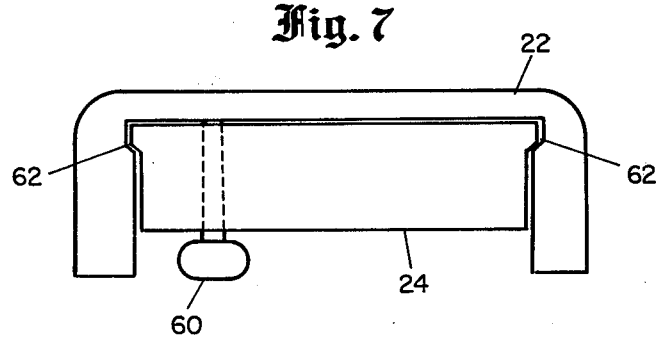
FIG. 7 is a cross-sectional view taken through lines VII—VII of FIG. 6.

As shown to better advantage in the bottom view of FIG. 6, and the cross-sectional view of FIG. 7, the movable element 24 is provided for accommodating different size womens's bikes. When the wing screw 60 is loosened, the element 24 is free to move in the grooves 62 near the inner upper surface of the carrier 22, and the notch 64 in the adjustable part 24 may be brought into engagement with the seat supporting member of the girl's bike, as shown in FIG. 1, The wing screw 60 is then tightened to hold the assembly firmly in position.

The bottom view of FIG. 6 is also of interest in showing the transverse members 66 and 68 which serve to securely hold the carrier on the bar of a man's bike. Incidentally, to avoid interference with the bar of a man's bike, the part 24 is removed, when the unit 22 is employed on a man's bike.

The additional supporting elements 70 and their associated holes 72 hold the ends of the heavy footrest wires when the unit is employed for carrying children.

The two flat structural members 74 and 76 extend along the bottom of the carrier at its front end, and serve to engage the 1⅛ inch diameter of the front portion of the frame of the bike, and thus preclude tilting movement of the carrier. The spacing of the inner edges of the elements 74 and 76 is therefore approximately equal to the 1⅛ inch final separation distance of the opposing sides of the notch 26 of the upper surface of the carrier 22. Incidentally, concerning other dimensions, the width of the notch 64 at the other end of the carrier is approximately one inch. In addition, the central notches in the members 66 and 68 are each one inch across, to accommodate the diameter of the bar 46. (See FIGS. 2 and 3).

FIG. 8 shows the footrest 38 with its associated heavy wires 40 in some detail, and divorced from the bike and the carrier with which they were shown associated in FIG. 1 of the drawings. It may be noted that the upper ends of the wires 40 are bent fit into the recesses 72, see FIG. 6. In addition, the footrest is provided with a central recess 82 for engaging one of the frame members of the bike and includes foot protector elements 84 to hold a child's feet from engaging the front wheel of the bicycle during turning maneuvers. The wires 40 are L-shaped in configuration to permit passage around the second bar in a ladies bike, and to give the needed resiliency for inserting the ends of the wires 40 into the recesses 72.

FIG. 9 is a bottom view of the short carrier 42 shown in FIG. 2. It is provided with a recess 50 in its upper surface which corresponds substantially to the recess 26 in the carrier 52 which has been considered in detail hereinabove. In addition, the short carrier 42 is provided with bosses 92 having holes therethrough, for receiving the upper ends of footrest wires 40; and has other holes in its side walls for securing arrangements such as the article holder 54 (FIG. 2).

In addition, the rear end of the carrier 42 may be provided with a bracket 94 which latches over one of the horizontal bar receiving notches 96 and is held in place by the wing screw 98 which engages the slot 100 in bracket 94.

FIGS. 10 and 11 are isometric and end views, respectively, of a simplified article carrier 102 which has a single layer front recess 104 and a longitudinally extending recess 106 with two side gripping arms 108 and 110 for securing to the horizontally extending bar of a man's bicycle. The two side members 112 and 114 may extend below the main horizontal surface 116 of the carrier to provide depending flanges 118 to which the hooks associated with resilient securing tension members may be secured. The unit may also be provided with reinforcing ribs 120 at the front and/or the back of the sidewalls 112 and 114 to help retain articles within the confines of the carrier, and to strengthen it.

Incidentally, concerning dimensions, in a preferred embodiment of FIGS. 1, 4, 5 and 6, the carrier was approximately 23 and 3/16 inch long, 4 and ¼ inches wide and one and one-half inches thick. For use on a man's bike, the slidable member 24 would be removed. The footrest was about 1½ inches wide and 13 inches long. The short carrier of FIGS. 2 and 9 was approximately 17 and ¾ inch long, with other dimensions being comparable to the unit of FIGS. 1 and 4 through 7. It is to be understood that these dimensions are illustrative, and that reasonable departures therefrom are contemplated.

In closing, it is to be understood that the embodiments of the invention as shown and described are merely illustrative of the principals of the invention. Thus for example, the embodiments may be formed of molded plastic, of good quality plywood, or of fiberglass reinforced plastic material. Other variations in the arrangements for securing parts together and for providing relative movement between parts may be employed. Accordingly, the present invention is not to be limited to that exactly as disclosed herein.

What is claimed is:

1. A solely manually installable carrier for mounting between the front fork and the seat of a bicycle comprising:
    means including an elongated support member for extending from the front fork of a bicycle and along the bar of a man's bicycle;
    means for holding said support member in place solely to gravity, friction and lateral support, said holding means including:
    (a) a deep notch at the front of said support member for engaging the front frame member of a bicycle immediately below the crown, with parallel side surfaces of said notch closely engaging the front frame member, and the upper surfaces of the support member disposed under the crown when the side surfaces of the notch engage the frame member;
    (b) means secured to said support member for engaging the horizontally extending bar of a man's bicycle on both sides of said bar at a point spaced by at least six inches from the fork to prevent lateral movement of the rear portion of the carrier;
    whereby said support member may be snapped into position by tilting said member forward and sliding it forward along said bar with the notch around the body of the fork, and then pushing the rear of said member down into the horizontal position until said engaging means are in position on either side of said bar to hold the support member in place, and the crown prevents substantial upward movement of the front end of said support member.

2. A carrier as defined in claim 1 further comprising longitudinally adjustable means for securing said carrier to the seat support of a woman's bicycle.

3. A carrier as defined in claim 1 further including a footrest, and means for supporting said footrest from said carrier.

4. A carrier as defined in claim 1 further comprising a child's seat removably secured to said carrier.

5. A carrier as defined in claim 1 further comprising means including vertically extending side members for holding books or the like, removably secured to said carrier.

6. A carrier as defined in claim 1, wherein said carrier is of the order of one inch or more in thickness, and wherein said support member includes means providing at least two vertically spaced bearing areas on each side of said notch for engaging said front member of said bicycle frame, for restraining said carrier against rotational movement about its longitudinal axis.

7. A carrier as defined in claim 1 further comprising a series of pairs of holes spaced along the length of said carrier for securing attachments thereto.

8. A carrier as defined in claim 1 further comprising a notched longitudinally movable securing means for engaging the seat support on a women's bicycle.

9. A manually installable bicycle carrier as defined in claim 1, wherein said front notch has a width of approximately one and one-eighth inches, and is more than one and one-half inches in depth.

10. A manually installable carrier for snapping onto the front of men's bicycles of all types comprising:
    an elongated substantially flat support member for resting on the bar of a man's bicycle;
    means including a deep central front notch on said member for sliding forward during installation with the rear of said member raised, to closely encompass the front fork enclosing frame portion of the bicycle with the front of said support on both sides of said notch extending forward, under the crown, whereby, when the rear of said support member is lowered onto the bar, the support member is held against substantial vertical movement, said notch having parallel opposite sides and a depth substantially greater than its width;
    means extending downward from said support member to engage the bar member on both sides thereof at a distance spaced back from said notch by at least six inches to prevent lateral movement of said support member on said bar; and
    means located at the front of said support member and spaced down from the upper surface of said support member for engaging the front fork enclosing member on both sides thereof to prevent rotation of said support member about the bar of the bicycle frame;
    whereby said support member may be quickly assembled to the frame of a man's bike by angling the member forward into engagement with the frame at the front of the bar and then tilting it downward onto the bar to firmly affix it into position.

11. A carrier as defined in claim 10 wherein the front of said carrier is angled back at an angle of approximately 15 degrees to substantially conform to the normal 15 degree angle of the front frame member of a bike.

12. A carrier as defined in claim 10 wherein said notch is gradually tapered.

13. A carrier as defined in claim 10 wherein the carrier is in the order of three to five inches in width.

14. A carrier as defined in claim 10 wherein said carrier is more than 16 inches but less than 26 inches in length.

15. A carrier as defined in claim 10 wherein said carrier is between one and two inches in thickness.

* * * * *